United States Patent [19]

Gold

[11] Patent Number: 4,521,472

[45] Date of Patent: * Jun. 4, 1985

[54] FABRIC AND METHOD OF MANUFACTURE USING SELVAGE BANDS

[76] Inventor: Kenneth A. Gold, 29 Wildwood Gardens, Port Washington, N.Y. 11050

[*] Notice: The portion of the term of this patent subsequent to Jul. 27, 1999 has been disclaimed.

[21] Appl. No.: 390,960

[22] Filed: Jun. 22, 1982

Related U.S. Application Data

[63] Continuation of Ser. No. 119,129, Feb. 6, 1980, Pat. No. 4,341,829.

[51] Int. Cl.³ ............................................. B32B 29/00
[52] U.S. Cl. ..................................... 428/53; 156/72; 428/55; 428/85; 428/115; 428/236; 428/302
[58] Field of Search .................... 428/53, 55, 85, 115, 428/234, 300, 236, 302; 156/72; 28/107, 109; 26/2 R

[56] References Cited

U.S. PATENT DOCUMENTS 3,950,587 4/1976 Colijn ................................. 428/234
4,341,829 7/1982 Gold ................................... 428/115

Primary Examiner—Marion E. McCamish
Attorney, Agent, or Firm—Darby & Darby

[57] ABSTRACT

A non-woven fabric is manufactured which utilizes as a primary component material the fringed selvage band resulting as a by-product in the manufacture of certain woven fabrics. Strips of selvage band are laid down on a non-woven backing or web in various configurations, depending upon the ultimate appearance that is desired. The selvage strips are then secured to the backing by punching with an array of forked needles, each of which forces a loop of yarn from the selvage through a hole in the backing.

7 Claims, 10 Drawing Figures

FABRIC AND METHOD OF MANUFACTURE USING SELVAGE BANDS

This is a continuation of application Ser. No. 119,129, filed Feb. 6, 1980 now U.S. Pat. No. 4,341,829.

The present invention relates generally to fabrics and, more particularly, concerns a non-woven fabric and a method for its manufacture.

In the manufacture of fabrics, there is often a substantial amount of waste material produced. For example, in weaving fabric on a rapier loom or certain other similar types of looms, a selvage with a fringed edge is produced. Before removing the fabric from the loom, this selvage edge is clipped to produce a continuous woven band with fringes protruding laterally from one edge. This clipped selvage band is collected and discarded. Not only does this selvage band represent a waste of material, but additional expenses are involved in collecting and disposing thereof.

Broadly it is an object of the present invention to manufacture a fabric which makes use of waste materials from existing fabric manufacturing processes. It is specifically an object of the present invention to manufacture fabric which makes use of the fringed selvage band produced in the manufacture of some woven fabrics.

It is also an object of the present invention to produce a fabric which is attractive and durable, yet relatively inexpensive in that the primary raw material component is a waste product.

In accordance with an illustrative embodiment demonstrating objects and features of the present invention, a non-woven fabric is manufactured which utilizes as a primary raw material the fringed selvage band resulting as a by-product in the manufacture of certain woven fabrics. Strips of selvage are laid down on a non-woven backing or web in various configurations, depending upon the ultimate appearance that is desired. The selvage strips are then secured to the backing by punching with an array of forked needles, each of which forces a loop of yarn from the selvage through a hole in the backing.

The foregoing brief description, as well as further objects, features and advantages of the present invention will be more completely understood from the following detailed description of presently preferred, but not less illustrative, embodiments in accordance with the present invention, with reference being had to the accompanying drawing wherein.

Figure 1:
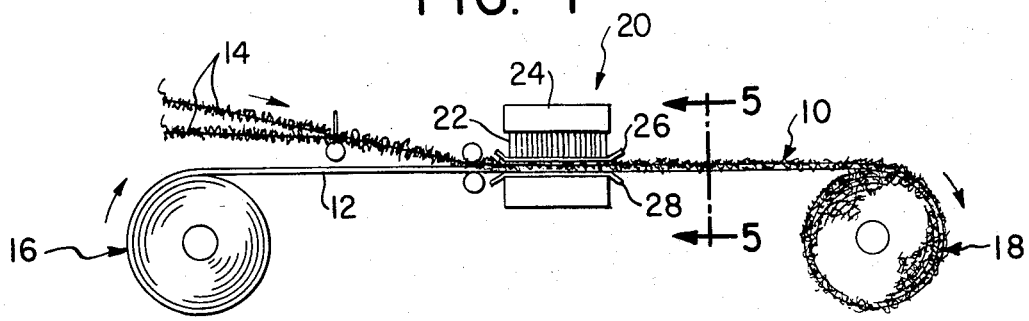
FIG. 1 is a front elevational view illustrating schematically how a preferred form of a fabric in accordance with the present invention may be manufactured.

Referring now to the details of the drawing, FIG. 1 illustrates a process for manufacturing fabric 10 from fringed selvage bands in accordance with the present invention. The fabric 10 is formed from a non-woven backing material 12 and a plurality of fringed selvage bands 14. The selvage bands may be provided from any conventional storage source, such as a creel, and the backing 12 is supplied from a roll of material 16. The selvage bands 14 and the backing 12 are fed in the same direction (to the right in FIG. 1) and are joined together by means of a needle punching assembly 20. The finished fabric 10 is supplied directly to the take-up roll 18.

Figure 2:
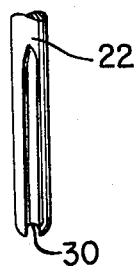
FIG. 2 is a fragmentary view of a forked needle of the type used in manufacturing a fabric in accordance with the present invention.

The needle punching assembly 20 comprises an array of needles 22 secured in a holder 24, a top plate 26 and a bottom plate 28. Each of the needles 22 preferably has a forked end 30 (see FIG. 2). In the preferred embodiment, the needles are arranged so as to provide a density of 6.25 needles per square inch.

Figure 3:
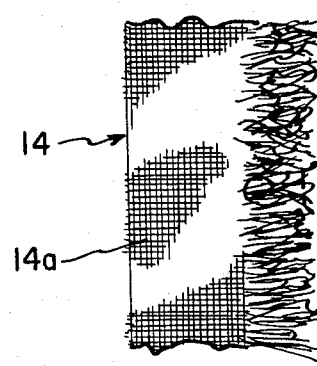
FIG. 3 is a fragmentary plan view of a fringed selvage band of the type used to manufacture fabric in accordance with the present invention.

The backing 12 is preferably a non-woven fabric sold under the trade name CEREX, a heat bonded mass of non-woven synthetic fiber threads. However, it will be appreciated that many other types of materials could be useful as a backing material including paper and flexible sheet plastic material (e.g. polyethylene, vinyl). The construction of the fringed selvage band 14 is illustrated in detail in FIG. 3. The band 14 includes a woven portion 14a and a fringed portion 14b. The fringed portion comprises the weft threads of the original woven fabric from which the selvage has been removed.

Figure 4:
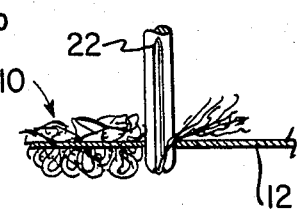
FIG. 4 is a sectional view illustrating a single fork needle punching a fiber or yarn from the selvage through the backing.

In practice, the fringed selvage bands 14 are laid down in a substantially parallel arrangement along the backing 12 and the needle punch assembly 20 is preferably operated to punch at a rate of approximately 135 punches per inch. The needle spacing is not critical and can be varied depending on the decorative appearance and characteristics desired in the end product. Each time a needle 22 passes into the selvage band 14, a yarn or section of fibers from the selvage band is caught by the forked end 30 of the needle 22 to form a loop. In some instances only a few filaments of a particular yarn may be snagged and carried through the body of the non-woven substrate by the forked needle. The yarn or fibers are compressed as the needle continues its downward stroke and penetrates the backing material 12 to produce a hole therein (see FIG. 4). The needle therefore pushes a loop of yarn or fibers through the bottom of the backing material and preferably for at least ¼ inch beyond the backing material. All this time the bottom plate 28 prevents the backing material 12 from moving with the needle. As the needle begins its upward stroke, the fibers or yarn are no longer compressed by the forked end of the needle. In addition, the hole in the backing material tends to close around the yarn or fibers. These two effects combine to retain the loop of yarn or mass of fibers and prevents it from returning with the upwardly travelling needle. In addition, the top plate 26 prevents the backing and selvage bands 14 from following the needles 22 upward.

Figure 5:
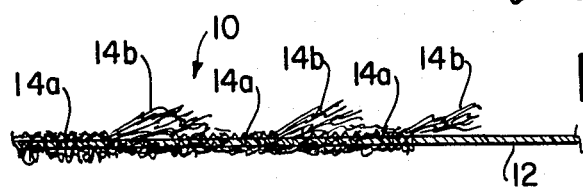
FIG. 5 is a sectional view along line 5—5 in FIG. 1, illustrating the cross section of a fabric manufactured in accordance with the illustrative process.
Figure 6:
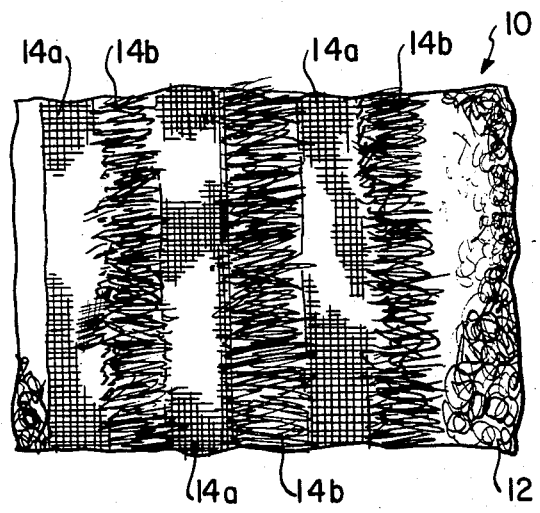
FIG. 6 is a plan view of the fabric of FIG. 5.
Figure 7:
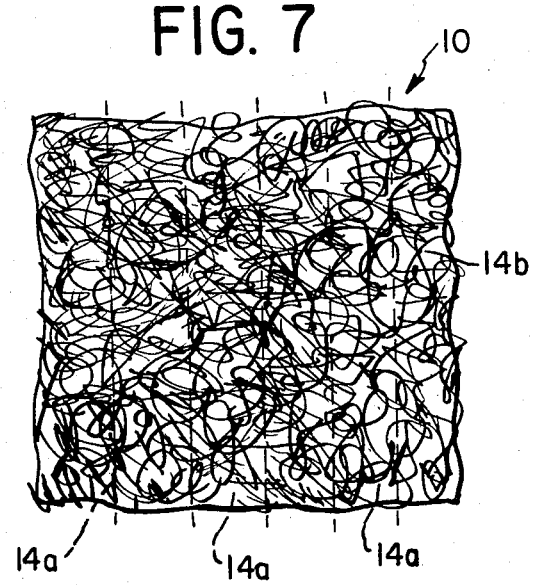
FIG. 7 is a plan view of a fabric similar to FIG. 6 in which parallel strips of selvage have been overlapped to provide a different shag-like appearance.

It has been found that, by varying the spacing between the parallel selvage bands 14, fabric of various appearances can be achieved. For example, the fabric illustrated in FIGS. 5 and 6 is obtained by laying the selvage bands side-by-side. This results in a fabric which has a woven shaggy look along its length. That is, shaggy portions and woven portions alternate. If the selvage bands 14, however, are placed closer together so as overlap, the weight of the fabric increases and a shaggy appearance results (See FIG. 7).

Figure 8:
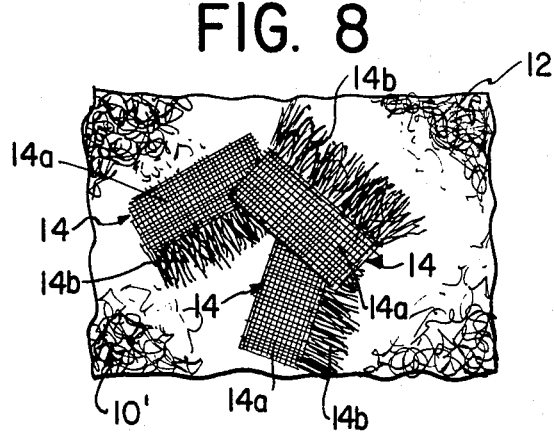
FIG. 8 is an alternate form of fabric in which strips of selvage are laid down in a random arrangement.

In the alternative embodiment 10' of the fabric 10, which is shown in FIG. 8, strips of the selvage bands 14 were laid down in a random pattern and then needle punched. This provided a variable pattern with a woven shaggy look.

Figure 9:
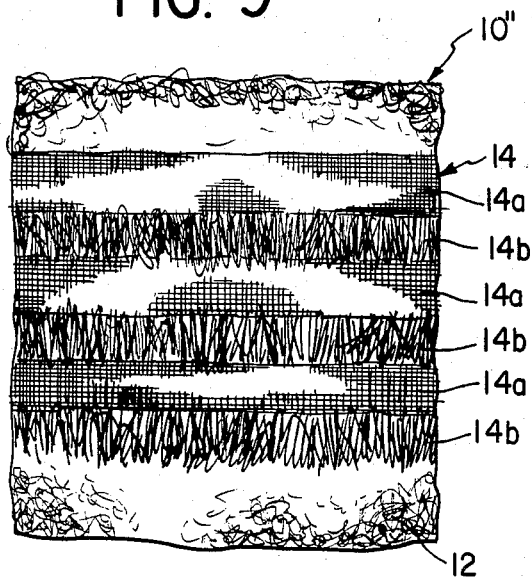
FIG. 9 is an alternate form of fabric in which strips of selvage are laid down laterally to the direction of feed of the backing material.

In the alternate embodiment 10" of the fabric 10 (FIG. 9), the selvage ends 14 were laid across the backing material 12 instead of along its length, to provide a shaggy woven look across the width of the fabric. The spacing of the selvege ends 14 may be varied to provide different densities of shag.

Figure 10:
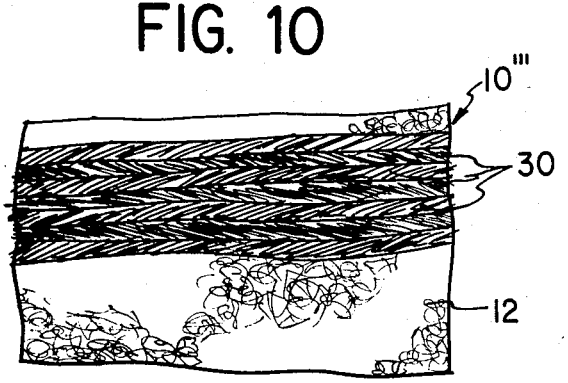
FIG. 10 is a further alternate embodiment of a fabric in accordance with the present invention wherein individual yarns are laid down on the backing material.

In a further alternate embodiment 10''' of the fabric 10 (FIG. 10), lengths of waste yarn 30 are laid down directly on the backing material 12 and are then secured thereto by punching with an array of forked needles 22. The various orientations that were used with selvage bands may also be used with yarns. The illustrative embodiment 10''' corresponds to the fabric 10 of FIGS. 5 and 6. The yarns 30 are long yarns commonly used as the warp yarn in weaving. In the present instance these were low grade (too low a quality for weaving) warp yarns which were mounted on a creel and fed parallel to the feed direction of the backing material as in FIG. 1. By laying the fibers side-by-side or the backing material and needle punching, as described above, a fabric with a striped pattern was produced.

Although preferred forms of the invention have been disclosed for illustrative purposes, it will be appreciated by those skilled in the art that many additions, modifications and substitutions are possible without departing from the scope and spirit of the invention as defined in the accompanying claims.

What is claimed is:

1. A non-woven fabric including, as a primary component, a fringed selvage band of the type obtained as a by-product of the manufacture of certain-woven fabrics, said non-woven fabric further including a non-woven backing material to the surface of which said selvage band is secured.

2. A non-woven fabric comprising a non-woven backing material having a plurality of holes formed therein, and strips of fringed selvage band secured to said backing material by having loops of fibers therefrom extending into and through the holes in said backing material.

3. A fabric as in claim 2 wherein said strips of selvage band are arranged to lie side by side and generally parallel to the length of said backing material.

4. A fabric as in claim 2 wherein said pieces of selvage band are arranged to lie in an overlapping arrangement and generally parallel to the length of said backing material.

5. A fabric as in claim 2 wherein said strips of selvage band are arranged to extend in generally parallel alignment across the width of said backing material.

6. A fabric as in claim 2 wherein said strips of selvage band are positioned in a random arrangement on said backing material.

7. A method for manufacturing a non-woven fabric including as a primary component a fringed selvage band of the type obtained as a by-product of the manufacture of certain woven fabrics comprising the step of securing said selvage band to a non-woven backing material.

* * * * *